US012081689B2

(12) United States Patent
Sarry et al.

(10) Patent No.: US 12,081,689 B2
(45) Date of Patent: Sep. 3, 2024

(54) SHIELDING OF OPTICAL ELEMENT FROM EXTERNAL ELECTRICAL AGGRESSION

(71) Applicant: Apple Inc., Cupertino, CA (US)

(72) Inventors: Julien Sarry, San Francisco, CA (US); Henry M. Daghighian, Cupertino, CA (US)

(73) Assignee: Apple Inc., Cupertino, CA (US)

(*) Notice: Subject to any disclaimer, the term of this patent is extended or adjusted under 35 U.S.C. 154(b) by 53 days.

(21) Appl. No.: 17/946,016

(22) Filed: Sep. 15, 2022

(65) Prior Publication Data

US 2024/0098165 A1 Mar. 21, 2024

(51) Int. Cl.
*H04M 1/02* (2006.01)
*H04N 23/52* (2023.01)
*H04N 23/55* (2023.01)
*H04N 23/57* (2023.01)

(52) U.S. Cl.
CPC .......... *H04M 1/0264* (2013.01); *H04N 23/52* (2023.01); *H04N 23/55* (2023.01); *H04N 23/57* (2023.01)

(58) Field of Classification Search
CPC ..... H04M 1/0264; H04N 23/52; H04N 23/55; H04N 23/57
See application file for complete search history.

(56) References Cited

U.S. PATENT DOCUMENTS

| | | | |
|---|---|---|---|
| 7,997,812 B2 | 8/2011 | Kim | |
| 8,582,022 B2 | 11/2013 | Rudmann | |
| 8,750,700 B2 | 6/2014 | Yamamoto | |
| 8,754,980 B2 | 6/2014 | Anderson et al. | |
| 9,099,368 B2 * | 8/2015 | Halliday | H04N 23/57 |
| 9,525,832 B1 * | 12/2016 | De La Cruz | G01D 11/245 |
| 9,986,669 B2 | 5/2018 | Uprety et al. | |
| 10,638,027 B2 | 4/2020 | Pfeiffer et al. | |
| 10,701,255 B2 * | 6/2020 | Wang | H04N 23/57 |
| 2009/0134483 A1 * | 5/2009 | Weng | H01L 27/14627 257/E31.127 |
| 2020/0244856 A1 * | 7/2020 | Kim | H04N 23/52 |
| 2022/0285044 A1 * | 9/2022 | Liu | H10K 71/60 |
| 2022/0351878 A1 * | 11/2022 | Matsumoto | H01B 5/14 |

FOREIGN PATENT DOCUMENTS

JP H09127304 A * 5/1997 ............... G02B 1/10

* cited by examiner

*Primary Examiner* — Nhan T Tran
(74) *Attorney, Agent, or Firm* — Fish & Richardson P.C.

(57) ABSTRACT

Embodiments are disclosed for shielding of an optical element of an imaging device in a mobile device. In an embodiment, an imaging device includes: an optical element; a metallic shielding enclosure, wherein the optical element is partially located within the metallic shielding enclosure; an electrically conductive coating layer applied on a surface of the optical element that is outside the metallic shielding enclosure, wherein the electrically conductive coating layer is electrically connected to the metallic shielding enclosure.

22 Claims, 7 Drawing Sheets

SHIELDING OF OPTICAL ELEMENT FROM EXTERNAL ELECTRICAL AGGRESSION

TECHNICAL FIELD

This disclosure relates generally to shielding of an optical element from electrical aggression.

BACKGROUND

In a mobile device (e.g., a mobile phone), the embedded cameras and/or time-of-flight (TOF) sensors, except one or more optical elements (e.g., lenses), are encapsulated in a metallic shielding enclosure. The metallic shielding enclosure is used to protect the embedded cameras and/or TOF sensors from mechanical or external electrical aggression (such as electrostatic discharge (ESD) and Electromagnetic Interference (EMI)). The metallic shielding enclosure is also used to protect other electronic components nearby from electrical aggression caused by the embedded cameras or/and TOF sensors.

The shielding effect of a metallic shielding enclosure is normally inversely proportional to a size of an optical aperture, through which the lenses/optical windows can receive/emit light. The larger the optical aperture, the weaker the electrical shielding will be. The current trend for mobile phone design is to develop cameras/TOF sensors with increasing resolution and range, which require larger optical elements (e.g., lenses). Larger optical elements and/or higher energy laser pulses result in cameras/TOF sensors' increased Radio Frequency (RF)/Microwave (MW) emissions and susceptibility to being impacted by noises from other electronic components outside of the metallic shielding enclosure. In addition, the trend of miniaturization of a mobile device will increase the risk for ESD vulnerability and EMI due to closer proximity to electronic elements.

SUMMARY

Embodiments are disclosed for shielding an optical element of an imaging device (e.g., a camera, a TOF sensor, or a Light Detection and Ranging (Lidar) sensor) in a device (e.g., a mobile device with one or more embedded sensors). In some embodiments, a semi-transparent electrically conductive layer is provided on a surface of the optical element that is outside the metallic shielding enclosure. In some embodiments, a first coating structure is provided on the surface of the optical element that is outside the metallic shielding enclosure. The first coating structure includes semi-transparent electrically conductive layers and semi-transparent ferrite coating layers, and these two layers are interleaved with each other. In some embodiments, a second coating structure is provided on the surface of the optical element that is outside the metallic shielding enclosure. The second coating structure includes a protective layer, a transparent electrically conductive layer, and an adhesion layer. In some embodiments, a third coating structure is provided on the surface of the optical element that is outside the metallic shielding enclosure. The third coating structure includes a protective layer, at least one anti-reflective coating layer, a transparent electrically conductive layer, and an adhesion layer. In some embodiments, an electrically conductive coating layer is applied on an inner surface of the metallic shielding enclosure. In some embodiments, a coating structure is applied on an inner surface of the metallic shielding enclosure. The coating structure includes electrically conductive coating layers and ferrite coating layers, wherein the electrically conductive coating layers and the ferrite coating layers are interleaved with each other.

In some embodiments, an imaging device is provided and includes: an optical element; a metallic shielding enclosure electrically connected to ground, wherein the optical element is partially located within the metallic shielding enclosure; an electrically conductive coating layer applied on a surface of the optical element that is outside the metallic shielding enclosure, wherein the electrically conductive coating layer is electrically connected to the metallic shielding enclosure.

In some embodiments, the imaging device further includes at least one electrically conductive bridge, wherein the electrically conductive coating layer is electrically connected to the metallic shielding enclosure through the at least one electrically conductive bridge.

In some embodiments, the imaging device includes two electrically conductive bridges, and the two electrically conductive bridges are located at two ends of the electrically conductive coating layer, respectively.

In some embodiments, the at least one electrically conductive bridge is made of a material including epoxy and electrically conductive particles.

In some embodiments, the electrically conductive particles are silver particles or gold particles.

In some embodiments, the electrically conductive coating layer is made of indium zinc oxide, indium Tin oxide, or silver oxide.

In some embodiments, the electrically conductive coating layer is doped with Neodymium (III) fluoride.

In some embodiments, the imaging device further includes a first anti-reflective coating layer located on the electrically conductive coating layer and a second anti-reflective coating layer located on an inner surface of the optical element that is inside the metallic shielding enclosure.

In some embodiments, the second anti-reflective coating layer partially covers the inner surface of the optical element.

In some embodiments, the imaging device further includes an adhesion layer that is located between the surface of the optical element and the electrically conductive coating layer.

In some embodiments, the adhesion layer is made of indium zinc oxide or indium tin oxide.

In some embodiments, the first anti-reflective coating layer and the second anti-reflective coating layer are made of magnesium fluoride.

In some embodiments, the imaging device further includes another electrically conductive coating layer applied on an inner surface of the metallic shielding enclosure.

In some embodiments, the imaging device further includes a coating structure applied on an inner surface of the metallic shielding enclosure, wherein the coating structure includes electrically conductive coating layers and ferrite coating layers, wherein the electrically conductive coating layers and the ferrite coating layers are interleaved with each other.

In some embodiments, an imaging device is provided and includes an optical element; a metallic shielding enclosure electrically connected to ground, wherein the optical element is partially located within the metallic shielding enclosure; a coating structure, including electrically conductive coating layers and ferrite coating layers, wherein the electrically conductive coating layers and the ferrite coating layers are interleaved with each other, wherein the coating structure is located on a surface of the optical element that is outside the metallic shielding enclosure, wherein the electrically conductive coating layers are electrically connected to the metallic shielding enclosure.

In some embodiments, the ferrite coating layers are made of bismuth ferrous oxide, nickel zinc copper ferrous oxide, magnesium ferrous oxide, or manganese based ferrous oxide.

In some embodiments, the ferrite coating layers are made of different materials.

In some embodiments, the number of the electrically conductive coating layers is three, and the number of the ferrite coating layers is two, wherein two ferrite coating layers are located among three electrically conductive coating layers.

In some embodiments, the ferrite coating layers are electrically connected to a voltage, so that the ferrite coating layers are magnetically tunable.

In some embodiments, the imaging device further includes another electrically conductive coating layer applied on an inner surface of the metallic shielding enclosure.

In some embodiments, the imaging device further includes another coating structure applied on an inner surface of the metallic shielding enclosure, wherein the another coating structure includes electrically conductive coating layers and ferrite coating layers, wherein the electrically conductive coating layers and the ferrite coating layers are interleaved with each other.

In some embodiments, a mobile device is provided and includes an imaging device. The imaging device includes an optical element; a metallic shielding enclosure electrically connected to ground, wherein the optical element is partially located within the metallic shielding enclosure; an electrically conductive coating layer applied on a surface of the optical element that is outside the metallic shielding enclosure, wherein the electrically conductive coating layer is electrically connected to the metallic shielding enclosure.

In some embodiments, a mobile device is provided and includes an imaging device. The imaging device includes: an optical element; a metallic shielding enclosure electrically connected to ground, wherein the optical element is partially located within the metallic shielding enclosure; a coating structure, including electrically conductive coating layers and ferrite coating layers, wherein the electrically conductive coating layers and the ferrite coating layers are interleaved with each other, wherein the coating structure is located on a surface of the optical element that is outside the metallic shielding enclosure, wherein the electrically conductive coating layers are electrically connected to the metallic shielding enclosure.

Particular embodiments disclosed herein provide one or more of the following advantages. In some embodiments, an electrically conductive layer is applied to an optical element (e.g., a lens) that is connected to a metallic shielding enclosure of an imaging device (e.g., a camera embedded in a mobile device), so that a complete shielding structure for the imaging device is formed. Electrical signals caused by external electrical aggression (e.g., EMI, ESD, such as Corona discharge) are absorbed or attenuated by the applied coating layer so that the electrical signals do not adversely affect performance of the imaging device. Further, the electrically conductive layer can be optically transparent, so that photons collected by a sensor of the imaging device and/or emitted by the transmitter of the imaging device can pass through the optical element and the applied coating layer without significant loss of the photons (high transmission).

In some embodiments, a coating structure is applied to an optical element, and includes a plurality of electrically conducting layers and a plurality of ferrite coating layers interleaved with the plurality of electrically conducting layers, to provide a broadband EMI shield (e.g., 1-10 GHz). Additionally, the coating structure can be used for embedded sensors emitting a laser light having a wavelength of 900-1550 nm (e.g., a Light Detection and Ranging (Lidar) sensor).

In some embodiments, an electrically conductive layer or a coating structure is applied on an inner surface of the metallic shielding enclosure, to reduce cavity resonance that is a potential source of EMI and RF emissions.

The details of one or more implementations of the subject matter are set forth in the accompanying drawings and the description below. Other features, aspects, and advantages of the subject matter will become apparent from the description, the drawings, and the claims.

DETAILED DESCRIPTION

The term "transparent" is not limited to "fully transparent," but also includes "semi-transparent" having a transparent rate above 90%.

Figure 1:
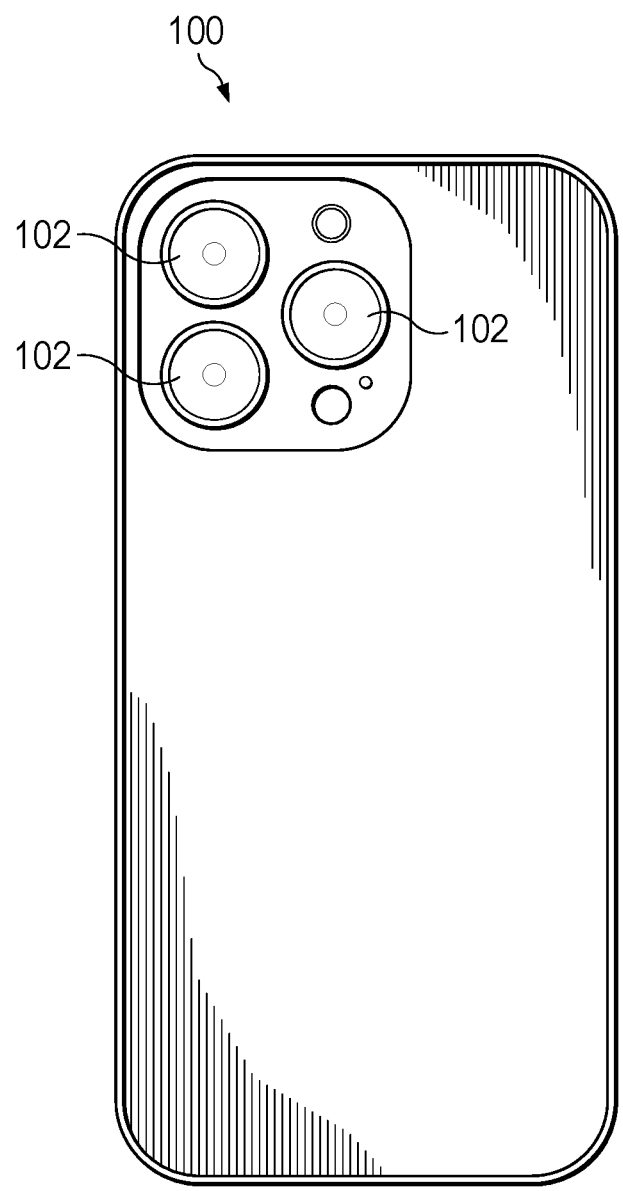
FIG. 1 is a diagram of an example mobile device including imaging devices, according to an embodiment.

FIG. 1 is a diagram of an example mobile device including imaging devices, according to an embodiment. The mobile device 100 (e.g., a mobile phone, a tablet, etc.) includes one or more imaging devices 102. The one or more imaging devices 102 can include one or more image sensors, such as a (complementary metal oxide semiconductor) CMOS sensor, a Lidar sensor (e.g., for three-dimensional (3D) cameras), etc.

Figure 2A:
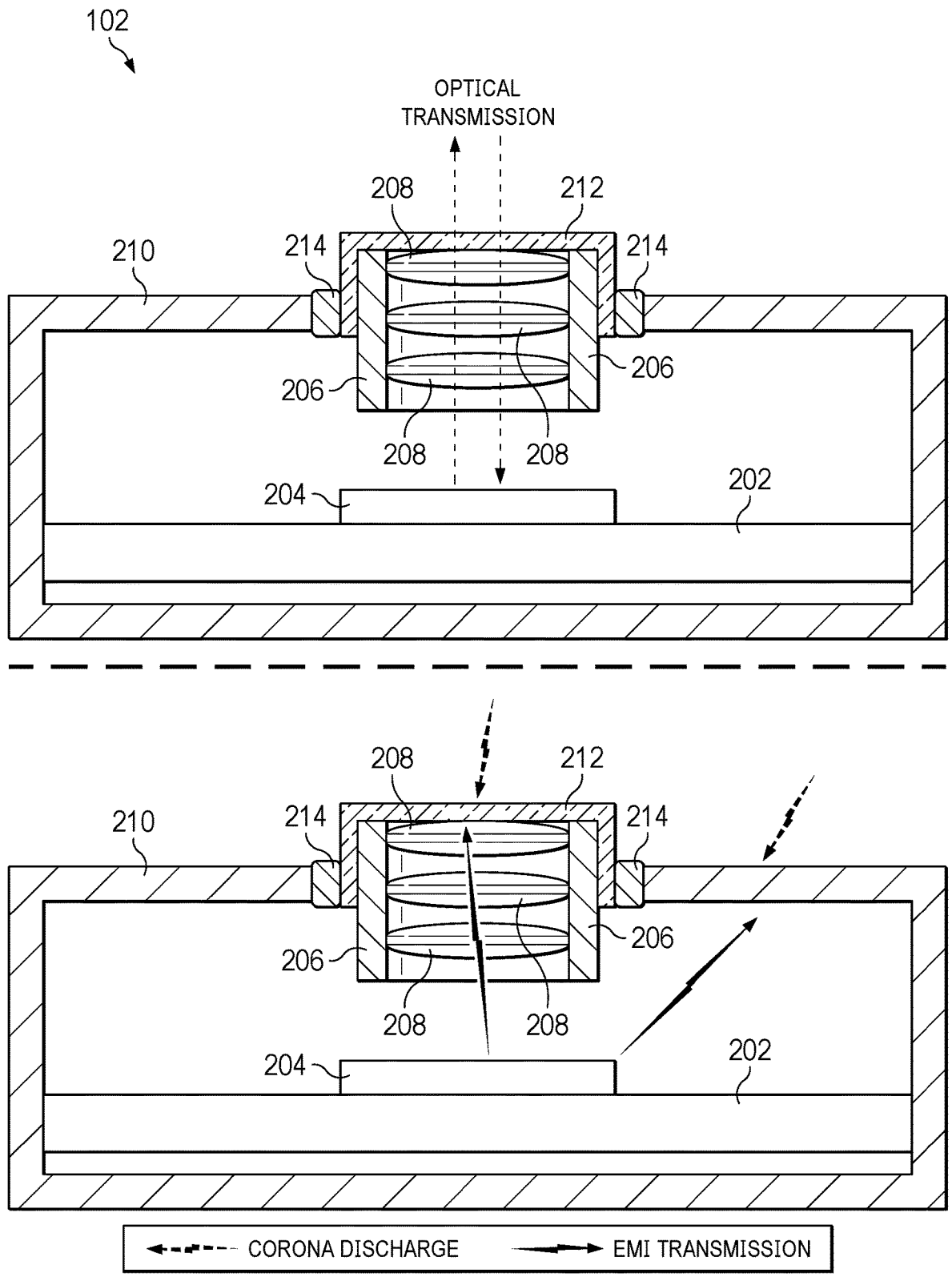
FIG. 2A is a diagram of an example imaging device, according to an embodiment.

FIG. 2A is a diagram of an example imaging device, according to an embodiment. The imaging device 102 includes a substrate 202, an image sensor 204 located on the substrate 202, a barrel 206 holding one or more optical elements 208, a metallic shielding enclosure 210 enclosing the substrate 202 and the image sensor 204. The image sensor 204 is configured to detect and convey information used to capture an image. In an embodiment, the image sensor 204 (e.g., a Lidar sensor) includes a light transmitter and a light receiver. Photons collected by the receiver and emitted by the transmitter can pass through the one or more optical elements 208 without significant loss of the photons.

In some embodiments, the imaging device 102 further includes an electrically conductive layer 212 applied on a surface of the top optical element 208 (the surface is exposed outside the metallic shielding enclosure 210), and electrically conductive bridges 214 connecting two ends of electrically conductive layer 212 to the metallic shielding enclosure 210. The metallic shielding enclosure 210 is connected to ground 211. The electrically conductive layer 212 covers a part of the barrel 206 that is located outside the metallic shielding enclosure 210. The electrically conductive layer 212, electrically conductive bridges 214, and the metallic shielding enclosure 210 form a complete shielding structure that protects imaging device components (e.g., substrate 202, image sensor 204) from interfering with other components in the mobile device 100. For example, other components in the mobile device 100 may generate electrical signals, e.g., ESD (such as Corona discharge), which are absorbed or attenuated by the electrically conductive layer 212. EMI caused by an optical pulsed transmitter can also be absorbed or attenuated by the electrically conductive layer 212.

In some embodiments, the electrically conductive layer 212 is optically transparent, and thus photons emitted by the transmitter can pass through the one or more optical elements 208 and the electrically conductive layer 212 without significant loss of photons. The optical transmission effect of photons is guaranteed.

In some embodiments, the electrically conductive layer 212 is made of metal, such as indium zinc oxide or indium tin oxide, etc. For example, the indium zinc oxide is ferromagnetic due to the element zinc and can provide more interaction with electromagnetic radiation. The electrically conductive bridges 214 can be a metallic gasket, or made of an electrically conductive material, such as metal, epoxy with highly electrically conductive particles (e.g., silver (Ag) particles or gold (Au) particles), solder material (e.g., indium-tin-silver solder), or other electrically conductive materials.

Figure 2B:
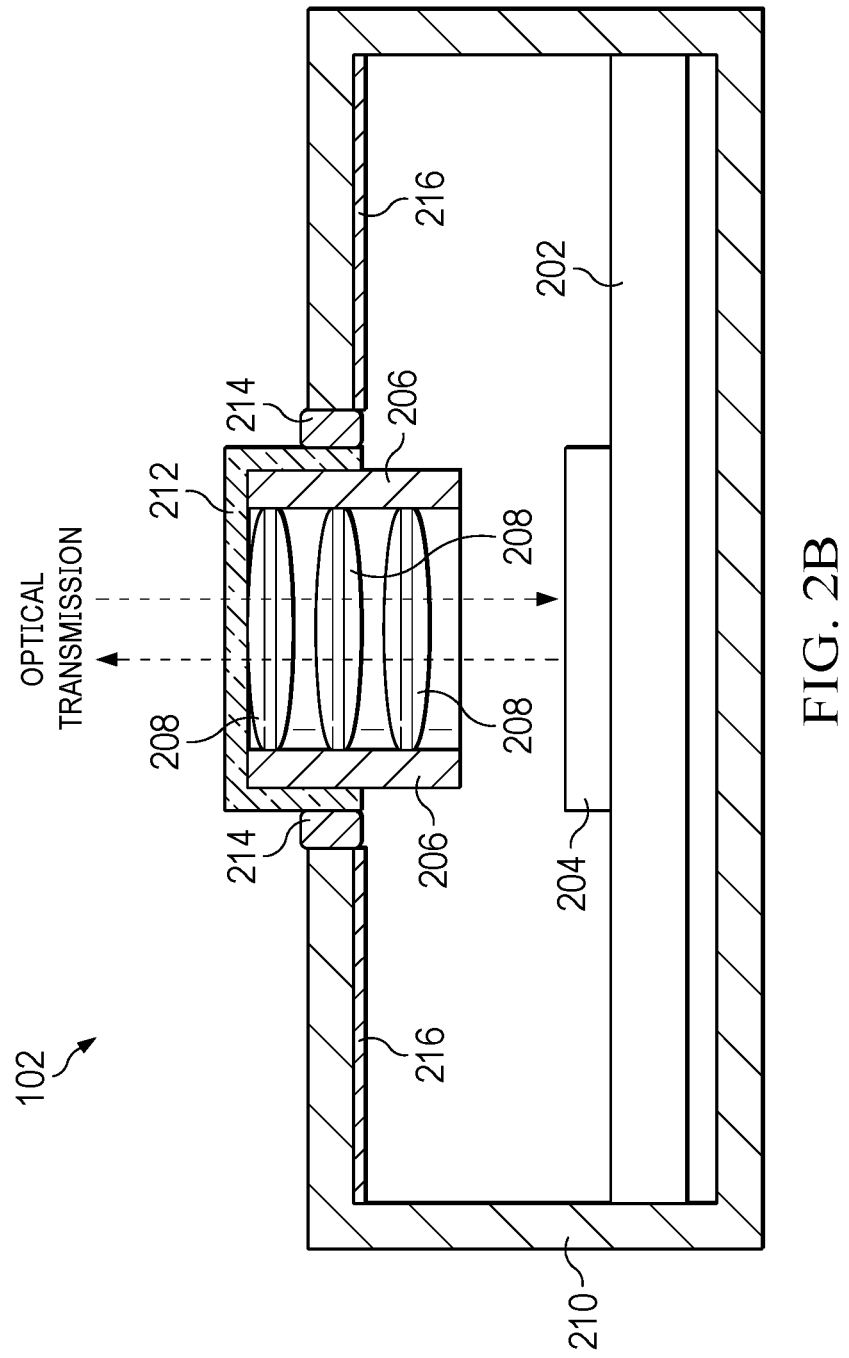
FIG. 2B is a diagram of another example imaging device, according to an embodiment.

FIG. 2B is a diagram of another example imaging device, according to an embodiment. The imaging device 102 further includes an electrically conductive layer 216 applied on an inner surface of the metallic shielding enclosure 210. The electrically conductive layer 216 can suppress cavity resonance that may amplify the EMI inside the metallic shielding enclosure 210. The cavity resonance is a potential source of EMI and RF emissions to the components outside of the metallic shielding enclosure 210.

Figure 2C:
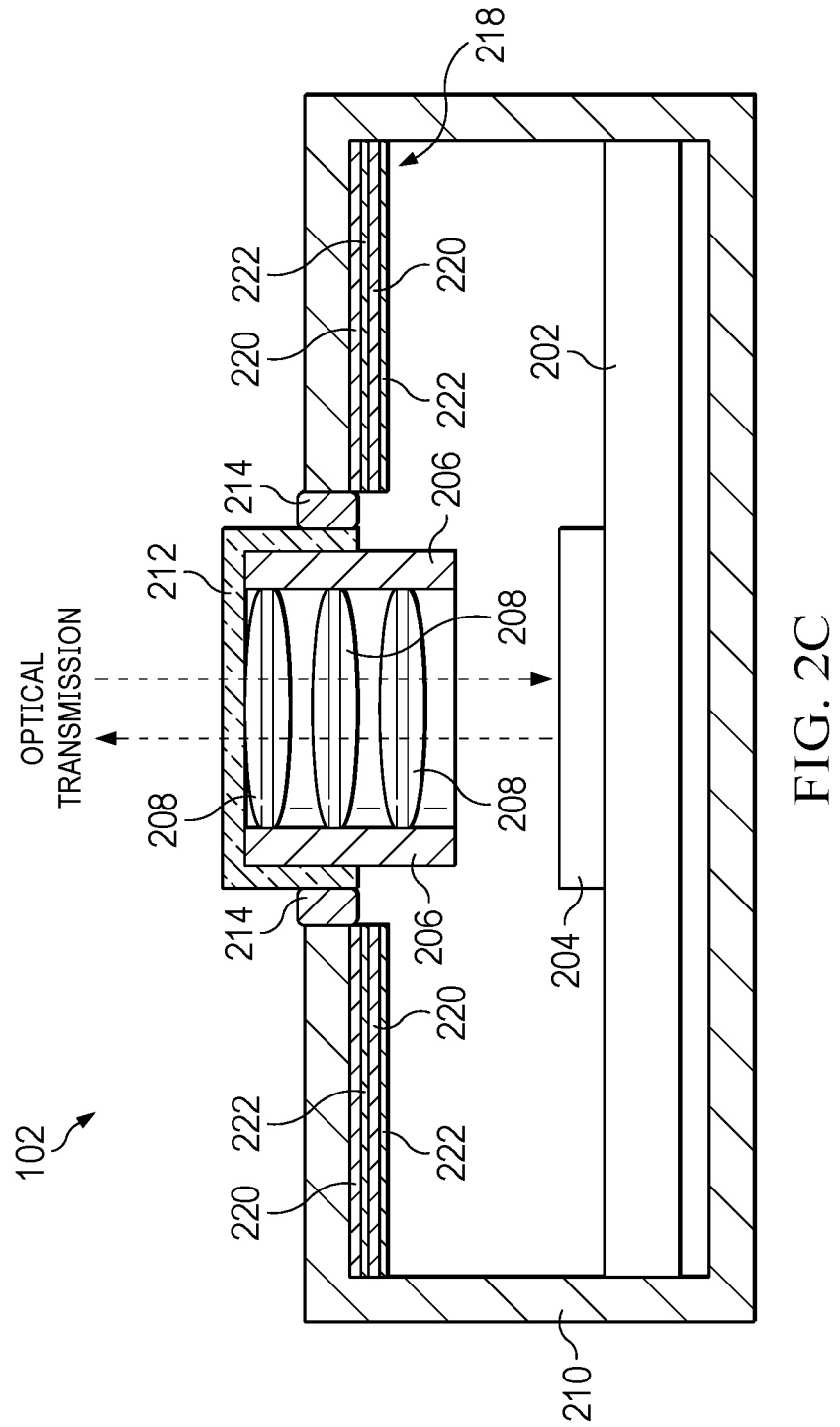
FIG. 2C is a diagram of another example imaging device, according to an embodiment.

FIG. 2C is a diagram of another example imaging device, according to an embodiment. The imaging device 102 further includes a coating structure 218 applied on an inner surface of the metallic shielding enclosure 210. The coating structure 218 includes a plurality of electrically conductive layers 220 (e.g., two electrically conductive layers 220) and a plurality of ferrite coating layers 222 (e.g., two ferrite coating layers 222). The electrically conductive layers 220 and the plurality of semi-transparent ferrite coating layers 222 are interleaved with each other. The coating structure 218 can suppress cavity resonance that may amplify the EMI inside the metallic shielding enclosure 210.

Figure 3:
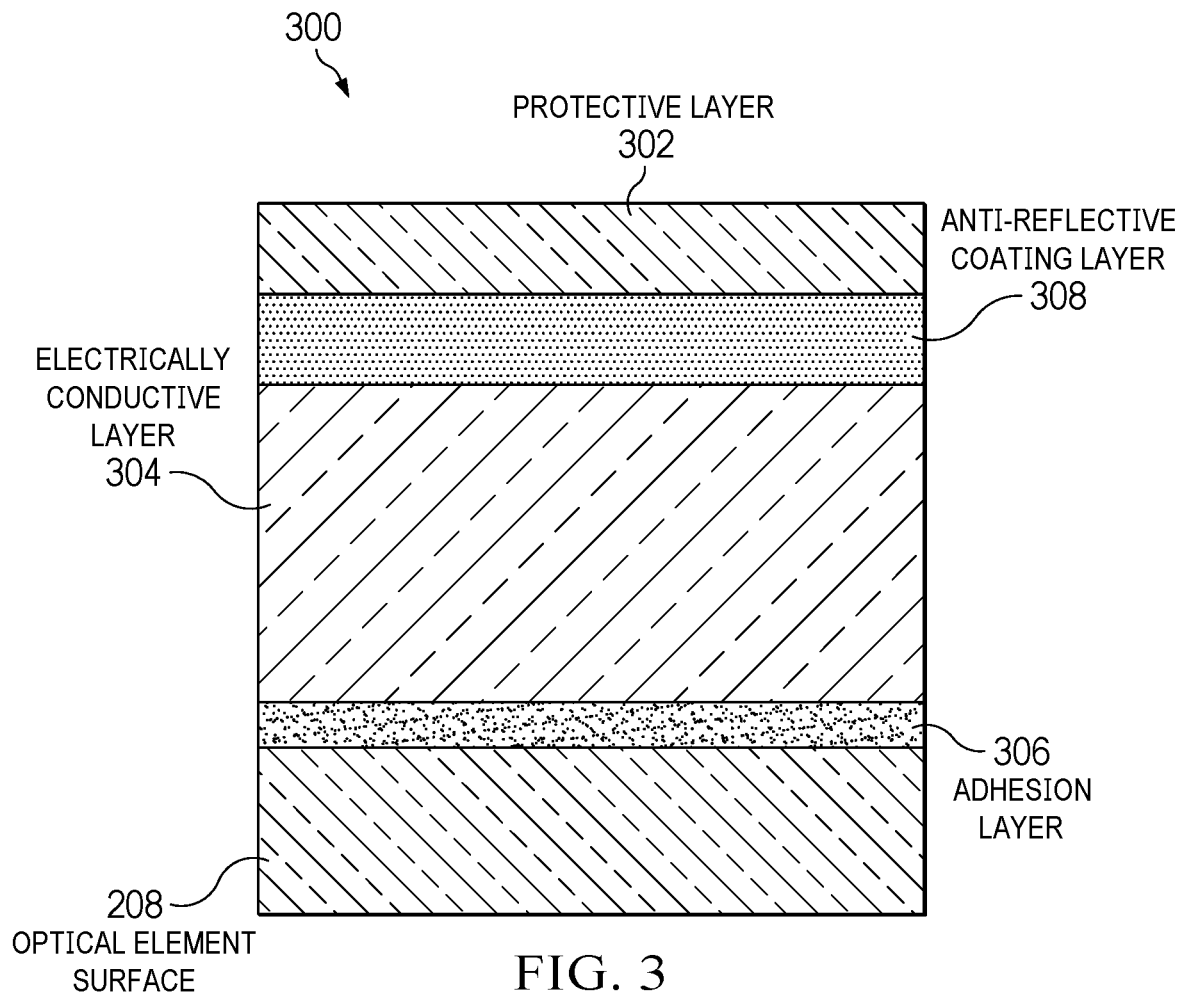
FIG. 3 is a diagram of an example coating structure, according to an embodiment.

FIG. 3 is a diagram of an example coating structure, according to an embodiment. Instead of a single electrically conductive layer 212, a coating structure 300 can be placed on an exposed surface of the top optical element 208. The surface of the top optical element 208 is exposed outside the metallic shielding enclosure 210 (as shown in FIG. 2). As shown in FIG. 3, the coating structure 300 includes a protective layer 302, a semi-transparent electrically conductive layer 304, and an adhesion layer 306. The protective layer 302 is used to protect the electrically conductive layer 304 and can be made of silicon nitride or regular glass. The adhesion layer 306 can be attached to the exposed surface of the top optical element 208, and can be made of the same material as the electrically conductive layer 304, e.g., indium zinc oxide or indium tin oxide. In some embodiments, the adhesion layer 306 is much thinner than the electrically conductive layer 304.

In some embodiments, the coating structure 300 can further include an anti-reflective coating layer 308, configured to prevent back reflection of optical light from the electrically conductive layer 304 into the transmitter, i.e., avoid light reflecting back from the electrically conductive layer 304 into the transmitter. The anti-reflective coating layer 308 is made of, e.g., silicon dioxide, and is located between the electrically conductive layer 304 and the protective layer 302.

Figure 4:
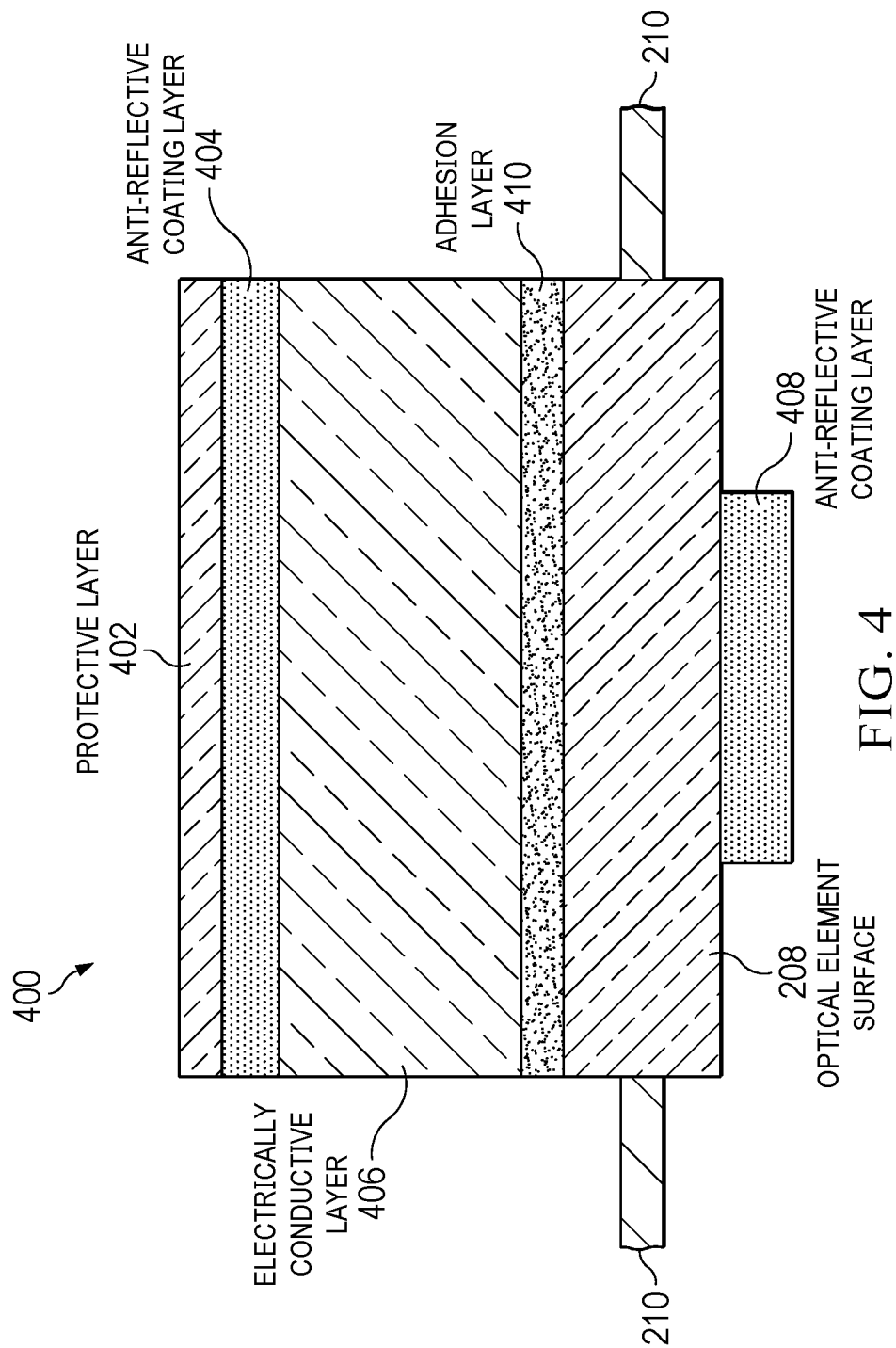
FIG. 4 is a diagram of another example coating structure, according to an embodiment.

FIG. 4 is a diagram of another example coating structure, according to an embodiment. As shown in FIG. 4, the coating structure 400 includes a protective layer 402, a first anti-reflective coating layer 404, an electrically conductive layer 406, a second anti-reflective coating layer 408, and an adhesion layer 410. The protective layer 402 and the adhesion layer 410 are the same as the protective layer 302 and the adhesion layer 306. The electrically conductive layer 406 is located between the first anti-reflective coating layer 404 and the adhesion layer 410. In some embodiments, each anti-reflective coating layer 404, 408 can be made of magnesium fluoride, and the electrically conductive layer 406 can be made of a doped indium tin oxide or a silver oxide. For example, the electrically conductive layer 406 can be doped with Neodymium (III) fluoride ($NdF_3$).

As shown in FIG. 4, one or more optical elements 208 (e.g., the top optical element) may be located outside of the metallic shielding enclosure 210, while the remaining one or more optical elements 208 (e.g., the middle optical element and the bottom optical element) may be located inside the metallic shielding enclosure 210. The second anti-reflective coating layer 408 is placed on an inner surface of the bottom optical element 208 and partially covers the inner surface of the bottom optical element 208. The partial coverage is to avoid light reflecting back from the electrically conductive layer 406 into the transmitter (the transmitter corresponds to the middle part of the optical elements 208), while letting the photons go through the uncovered optical element 208.

In some embodiments, the thickness of each layer is determined based on at least one of optical transmissivity, optical reflectivity, or shielding effectiveness. For example, the total thickness of the coating structure 400 can be less than about 10 microns. The thickness of the electrically conductive layer 406 can be more than about 5 microns. The thickness of each anti-reflective coating layer 404, 408 can be around 100 nanometers. The coating structure 400 is applied on an exposed surface of the top optical element 208 by plasma ion-assisted deposition (plasma-IAD) or plasma-enhanced chemical vapor deposition (PECVD). The coating structure 400 can provide broadband EMI shielding, e.g., the EMI shielding effectiveness range is 1-10 GHz.

Figure 5:
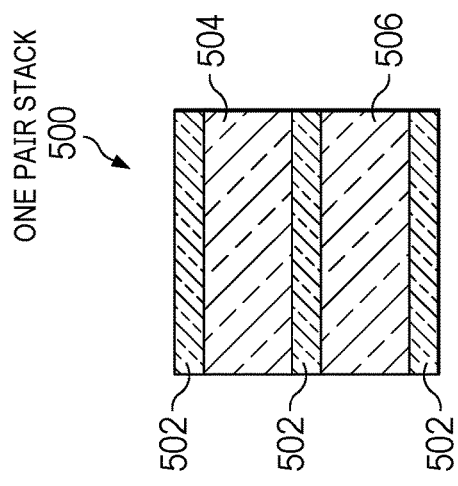
FIG. 5 is a diagram of another example coating structure, according to an embodiment.

FIG. 5 is a diagram of another example coating structure, according to an embodiment. As shown in FIG. 5, the coating structure 500 includes three electrically conductive layers 502, a first semi-transparent ferrite coating layer 504, and a second semi-transparent ferrite coating layer 506. The three electrically conductive layers 502 and the two ferrite coating layers 504, 506 are interleaved with each other. For example, the two ferrite coating layers 504, 506 are sandwiched among the three electrically conductive layers 502. In some embodiments, the first ferrite coating layer 504 is made of manganese based ferrous oxide (e.g., $Mn_{0.2}Zn_{0.0.8}Fe_2O_4$), and the second ferrite coating layer 506 is made of bismuth ferrous oxide (e.g., $B_rFe_{1-x}Zn_xO_3$, $BiFeO_3$), magnesium ferrous oxide (e.g., $Mg_{0.2}Mn_{0.2}Fe_{0.2}Co_{0.2}Ni_{0.2}Fe_2O_4$) or nickel zinc copper ferrous oxide (e.g., $Ni_{0.2}Cu_xZn_{0.8-x}Fe_2O_4$), and the three electrically conductive layers 502 are made of indium zinc oxide. The first ferrite coating layer 504 and the second ferrite coating layer 506 can be connected to a direct current (DC) voltage 508, e.g., 3.8 volts, to make them magnetically tunable ferrite absorbers, while the three electrically conductive layers 502 are connected to the ground. In an embodiment, the first ferrite coating layer 504 and the second ferrite coating layer 506 can also float, and are not electrically connected to a voltage source (e.g., DC voltage 508). The three electrically conductive layers 502 are connected to a metallic shielding enclosure (e.g., metallic shielding enclosure 210 of FIG. 2), which is grounded, through electrically conductive bridges (e.g., electrically conductive bridges 214 of FIG. 2). The first ferrite coating layer 504 and the second ferrite coating layer 506 can be electrically biased/isolated from the metallic shielding enclosure. In some embodiments, with different thicknesses of the first ferrite coating layer 504 and the second ferrite coating layer 506, the ferromagnetic resonance frequency of the ferrite can be tuned, which results in tuning the electromagnetic reflectivity and absorption to different frequencies. The first ferrite coating layer 504 and the second ferrite coating layer 506 can absorb high frequency (e.g., 1~10 GHz) EMI.

In some embodiments, the first ferrite coating layer 504 and the second ferrite coating layer 506 can be made of the same material or different materials. In some embodiments, magnesium ferrous oxide, manganese based ferrous oxide, bismuth ferrous oxide, or nickel zinc copper ferrous oxide is in a nano powder form (a powdered material with individual particles on a nanometer scale or a powdered material with crystalline on a nanometer scale). The nano powders can be packed into fine emulsion using optical adhesives, and sprayed, printed, or deposited on a surface of an electrically conductive layer 502.

The thickness of the electrically conductive layer 502 can be around 250 nanometers, the thickness of the first ferrite coating layer 504 can be around 1200 nanometers, and the thickness of the second ferrite coating layer 506 can be around 1000 nanometers. ESD and EMI, generated from either the inside of the imaging device 102 or other components of the mobile device 100, can be absorbed or attenuated by the coating structure 500.

Figure 6:
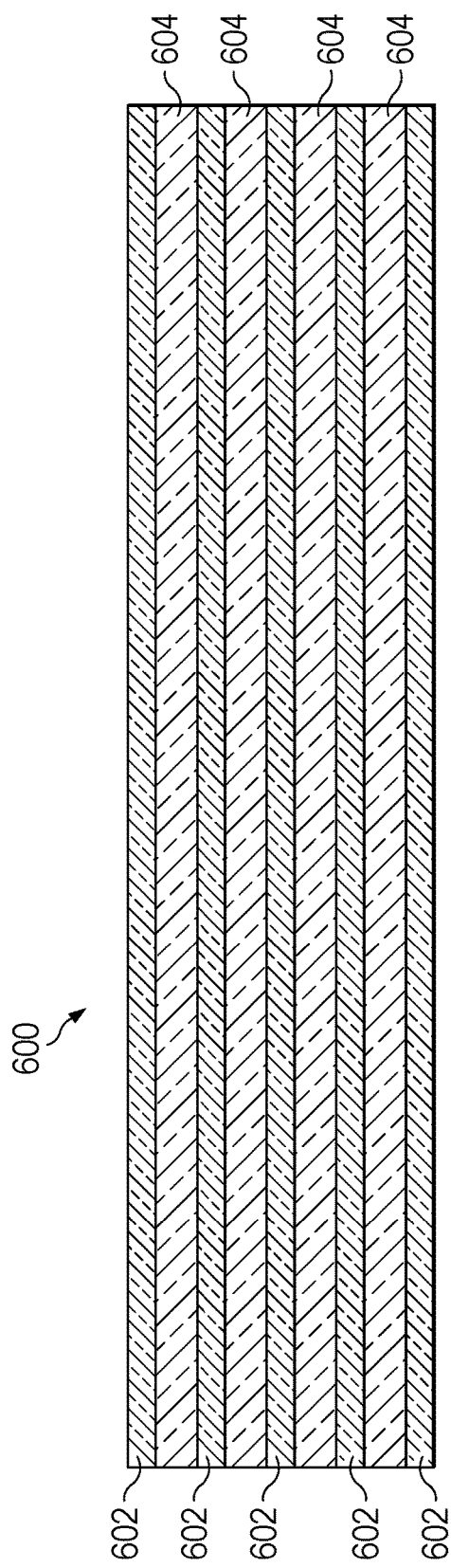
FIG. 6 is a diagram of another example coating structure, according to an embodiment.

FIG. 6 is a diagram of another example coating structure, according to an embodiment. As shown in FIG. 6, the coating structure 600 includes a plurality of electrically conductive layers 602 (e.g., five electrically conductive layers 602) and a plurality of semi-transparent ferrite coating layers 604 (e.g., four ferrite coating layers 604). The electrically conductive layers 602 and the plurality of semi-transparent ferrite coating layers 604 are interleaved with each other. The ferrite coating layers 604 can absorb high frequency (e.g., 1-10 GHz) EMI.

The electrically conductive layer 212, the coating structure 300, or the coating structure 400 can block ESD and shield narrowband (e.g., 10~11 GHz) EMI. The coating structure 500 or the coating structure 600 can block ESD and shield broadband (e.g., 1~10 GHz) EMI. In addition to blocking ESD and EMI, the electrically conductive layer 212, or the coating structure 300, 400, 500, 600 can also work as a scratch-resistant structure to protect the optical elements 208 from scratches and a thermal heat spreader across a larger area.

In some embodiments, the coating structure 500, 600 is opaque for visible lights having a wavelength less than 750 nanometers and transparent to lights having a wavelength over 900 nanometers (e.g., transparent to lights emitted from a Lidar sensor having a wavelength of 940 nanometers). The coating structure 500, 600 can reduce the emitted EMI from the imaging device 102 to protect other components in the mobile device 100 and work as a cavity resonance absorber.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

The invention claimed is:

1. An imaging device, comprising:
    an optical element;
    a metallic shielding enclosure electrically connected to ground, wherein the optical element is partially located within the metallic shielding enclosure;
    an electrically conductive coating layer applied on a surface of the optical element that is outside the metallic shielding enclosure, wherein the electrically conductive coating layer is electrically connected to the metallic shielding enclosure; and
    at least one electrically conductive bridge, wherein the electrically conductive coating layer is electrically connected to the metallic shielding enclosure through the at least one electrically conductive bridge.

2. The imaging device of claim 1, wherein the imaging device includes two electrically conductive bridges, and the two electrically conductive bridges are located at two ends of the electrically conductive coating layer, respectively.

3. The imaging device of claim 1, wherein the at least one electrically conductive bridge is made of a material including epoxy and electrically conductive particles.

4. The imaging device of claim 3, wherein the electrically conductive particles are silver particles or gold particles.

5. The imaging device of claim 1, wherein the electrically conductive coating layer is made of indium zinc oxide, indium Tin oxide, or silver oxide.

6. The imaging device of claim 5, wherein the electrically conductive coating layer is doped with Neodymium (III) fluoride.

7. The imaging device of claim 1, further comprising a first anti-reflective coating layer located on the electrically conductive coating layer and a second anti-reflective coating layer located on an inner surface of the optical element that is inside the metallic shielding enclosure.

8. The imaging device of claim 7, wherein the second anti-reflective coating layer partially covers the inner surface of the optical element.

9. The imaging device of claim 1, further comprising an adhesion layer that is located between the surface of the optical element and the electrically conductive coating layer.

10. The imaging device of claim 9, wherein the adhesion layer is made of indium zinc oxide or indium tin oxide.

11. The imaging device of claim 7, wherein the first anti-reflective coating layer and the second anti-reflective coating layer are made of magnesium fluoride.

12. The imaging device of claim 1, further comprising another electrically conductive coating layer applied on an inner surface of the metallic shielding enclosure.

13. The imaging device of claim 1, further comprising a coating structure applied on an inner surface of the metallic shielding enclosure, wherein the coating structure includes electrically conductive coating layers and ferrite coating layers, wherein the electrically conductive coating layers and the ferrite coating layers are interleaved with each other.

14. A mobile device, comprising the imaging device of claim 1.

15. An imaging device, comprising:
an optical element;
a metallic shielding enclosure electrically connected to ground, wherein the optical element is partially located within the metallic shielding enclosure; and
a coating structure, including electrically conductive coating layers and ferrite coating layers, wherein the electrically conductive coating layers and the ferrite coating layers are interleaved with each other,
wherein the coating structure is located on a surface of the optical element that is outside the metallic shielding enclosure, wherein the electrically conductive coating layers are electrically connected to the metallic shielding enclosure.

16. The imaging device of claim 15, wherein the ferrite coating layers are made of bismuth ferrous oxide, nickel zinc copper ferrous oxide, magnesium ferrous oxide, or manganese based ferrous oxide.

17. The imaging device of claim 15, wherein the ferrite coating layers are made of different materials.

18. The imaging device of claim 15, wherein a number of the electrically conductive coating layers is three, and a number of the ferrite coating layers is two, wherein two ferrite coating layers are located among three electrically conductive coating layers.

19. The imaging device of claim 15, wherein the ferrite coating layers are electrically connected to a voltage, so that the ferrite coating layers are magnetically tunable.

20. The imaging device of claim 15, further comprising another electrically conductive coating layer applied on an inner surface of the metallic shielding enclosure.

21. The imaging device of claim 15, further comprising another coating structure applied on an inner surface of the metallic shielding enclosure, wherein the another coating structure includes electrically conductive coating layers and ferrite coating layers, wherein the electrically conductive coating layers and the ferrite coating layers are interleaved with each other.

22. A mobile device, comprising an imaging device, wherein the imaging device comprises:
an optical element;
a metallic shielding enclosure electrically connected to ground, wherein the optical element is partially located within the metallic shielding enclosure; and
a coating structure, including electrically conductive coating layers and ferrite coating layers, wherein the electrically conductive coating layers and the ferrite coating layers are interleaved with each other,
wherein the coating structure is located on a surface of the optical element that is outside the metallic shielding enclosure, wherein the electrically conductive coating layers are electrically connected to the metallic shielding enclosure.

* * * * *